Jan. 13, 1953     J. ONIA ET AL     2,625,632
CONTROL APPARATUS
Filed Aug. 21, 1950

INVENTORS
JOHN ONIA
GENRIK S. SIRVIS
BY
Ellsworth R. Roston
ATTORNEY

Patented Jan. 13, 1953

2,625,632

UNITED STATES PATENT OFFICE 2,625,632

CONTROL APPARATUS

John Onia, Berkley, and Genrik S. Sirvis, Detroit, Mich., assignors to Bendix Aviation Corporation, Detroit, Mich., a corporation of Delaware Application August 21, 1950, Serial No. 180,586

3 Claims. (Cl. 201—48)

This invention relates to apparatus for providing a continuously variable resistance over a wide range of values and more particularly to apparatus having a control knob for providing a rough and fine control of a resistance over a wide range of values.

In many applications where a wide range of accurately controlled resistance values is required, such as in television receivers, two separate control knobs are provided. One control knob roughly regulates the resistance value by switching in additional resistors as the control knob is rotated. Rotation of the other control knob varies the resistance of a potentiometer connected to the resistors and thereby provides a fine regulation of the resistance value after the first knob has been adjusted.

Dual controls are undesirable for a number of reasons. They unnecessarily add to the number of variables in an equipment and tend to confuse people operating the equipment, especially such personnel as semi-skilled or unskilled technicians who are not completely familiar with its operation. They clutter the front panel of such equipment and detract from its appearance, and they unnecessarily occupy space on, as well as inside, the chassis.

This invention provides apparatus which employs only one control knob for providing a rough and fine regulation of a resistance over a wide range of values. The apparatus is compact, inexpensive and reliable.

An object of this invention is to provide apparatus for regulating a resistance over a wide range of values.

Another object of this invention is to provide apparatus of the above character requiring only one control knob to provide a rough and fine regulation of resistance over a wide range of values.

A further object is to provide apparatus of the above character for occupying a minimum amount of space on and inside a chassis.

Still another object is to provide apparatus of the above character which is relatively inexpensive, efficient and reliable.

Other objects and advantages will be apparent from a detailed description of the invention and from the appended drawings and claims.

Figure 1:
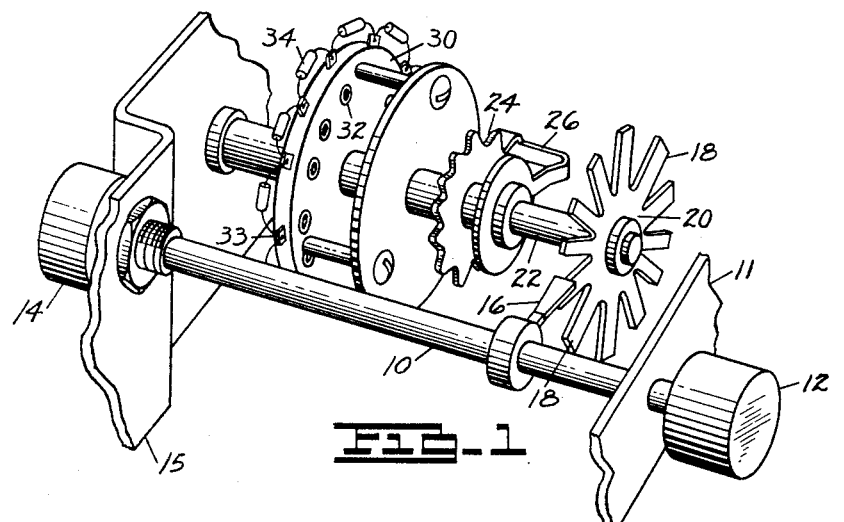
Figure 1 is a perspective view showing one embodiment of the invention.
Figure 2:
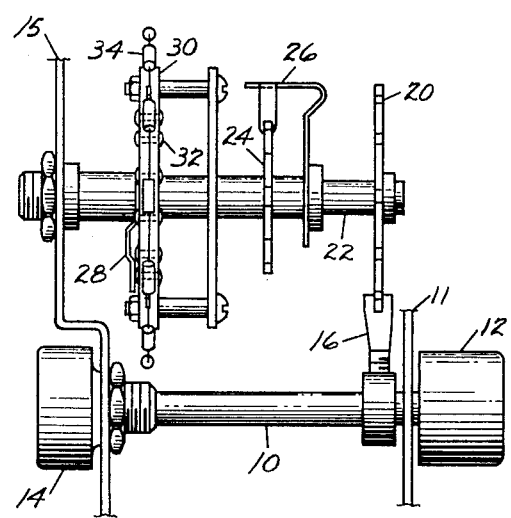
Figure 2 is a top plan view of the embodiment shown in Figure 1.
Figure 3:
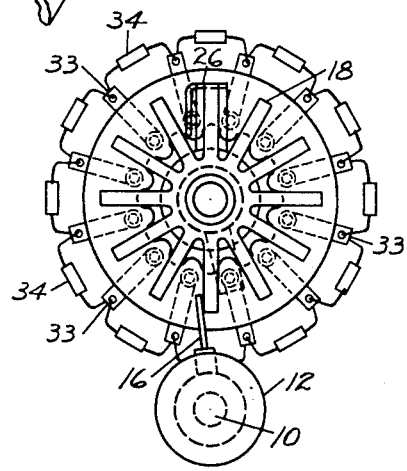
Figure 3 is a front elevational view of the embodiment shown in Figure 1.
Figure 4:
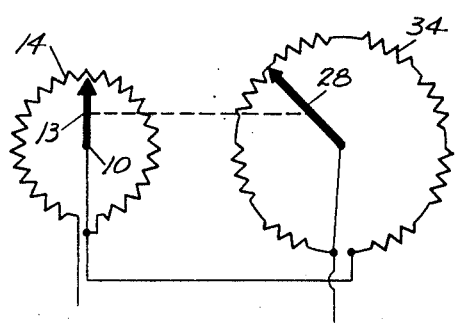
Figure 4 is a circuit diagram illustrating the electrical features of the embodiment shown in Figure 1.

In one embodiment of the invention, a shaft 10 is journalled in the front panel 11 of a chassis (not shown) and a control knob 12 is mounted on the shaft 10 in front of the panel 11. The movable arm 13 (Figure 4) of a potentiometer 14 is carried by the shaft 10 and is rigidly positioned against a bracket 15 as by a nut. A contact arm 16 is also carried by the shaft 10 and is adapted to engage one of a plurality of fingers 18 on a cam 20 when the movable arm 13 has been rotated clockwise on the potentiometer 14 to a position of maximum resistance.

The cam 20 is mounted on a shaft 22 journalled at one end in the bracket 15. The shaft 22 carries a ratchet wheel 24 having a plurality of teeth corresponding in number and position to the fingers 18 on the cam 20. A pawl 26 is associated with the ratchet wheel 24 to prevent the ratchet wheel and the cam from rotating through an angle greater than that formed by two adjacent cam fingers 18 every time the cam is engaged by the contact arm 16.

A rotary contact 28 of a switch 30 is rigidly mounted on the shaft 22 and is adapted to engage a plurality of stationary contacts 32 corresponding in number and position to the fingers 18 on the cam 20. A plurality of stationary terminals 33 extend from the stationary contacts 32. A different resistor 34 is connected between each terminal 33 and its adjacent terminal to provide a series arrangement which gives an incremental value of resistance every time the cam 20 is rotated in a counterclockwise direction by the contact arm 16. The resistances 34 preferably have a somewhat lower value than the potentiometer 14.

The movable arm 13 of the potentiometer 14 is rotated in a clockwise direction to increase the resistance between it and the low side of the potentiometer. When the movable arm 13 has reached the high side of the potentiometer, the contact arm 16 engages one of the fingers 18 on the cam 20. As the arm 13 rotates further through the blank space between the high and low sides of the potentiometer, the contact arm 16 rotates the cam 20 through an arc corresponding to that formed by two adjacent fingers. This produces a corresponding rotation of the rotary contact 28 and introduces a resistor 34 in series with the resistors already in the circuit.

Since the resistor 34 has a lower value than the potentiometer 14, the total resistance in the circuit after the rotation of the contact 28 is less than the resistance in the circuit with the movable arm 13 in its maximum position. The movable arm 13 of the potentiometer 14 must then be rotated through a partial revolution to produce the same resistance that existed before the roation of the contact 28. The overlap which results is desirable when a fine control of the resistance value is desired, since it prevents any breaks in the resistance value from occurring as the knob 12 is rotated.

Instead of rotating the contact 28 about the contacts 32, the contacts 32 may be rotated with the shaft 22 and the contact 28 may be held stationary. Such a rotation will vary the total resistance in the circuit in the same manner as the embodiment disclosed above. Furthermore, a variable impedance, such as an inductance, may be employed instead of the potentiometer 14 and constant impedances may be used in place of the resistances 34.

The apparatus disclosed above has several advantages over a potentiometer which has a value approximating the total resistance of the potentiometer 14 and the resistances 34. The above apparatus is capable of providing a much finer control of resistance than a potentiometer covering a wide range of values. Furthermore, the above apparatus is capable of operating at relatively high voltages because of the distribution of voltage between the potentiometer 14 and the resistances 34, whereas a potentiometer covering the same resistance range would break down from the high voltages. Since the potentiometer 14 is at the low side of the resistance network and since it generally has a low resistance compared to the total resistance in the network, the potentiometer 14 operates at a safe voltage.

There is thus provided apparatus for regulating a resistance over a wide range of values. The apparatus requires only one control knob to provide a rough and fine regulation of the resistance value. By employing only one knob, the front panel may be given a neat and clean appearance and the space required to house the apparatus may be minimized.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Apparatus for providing a continuously variable resistance over a wide range of values, including, a rotatable shaft, a potentiometer, a rotatable arm on the potentiometer and carried by the shaft for providing minute variations in the potentiometer resistance, a contact arm carried by the shaft, a second shaft, a cam carried by the second shaft, a plurality of fingers on the cam positioned to engage the contact arm on the first shaft upon each complete revolution of the contact arm, a switch supported on the second shaft and having a plurality of contacts, a plurality of resistances each connected between a pair of adjacent contacts and having electrical continuity with the potentiometer, and a contact arm for sequentially engaging the contacts on the switch upon complete revolutions of the potentiometer arm.

2. Apparatus for providing a continuously variable resistance over a wide range of values, including, a switch having a plurality of contacts and a contact arm for engaging the contacts, a plurality of resistances each connected between a pair of adjacent contacts on the switch, a shaft for providing a relative rotation between the contact arm and the contacts on the switch so as to vary the effective resistance provided by the switch, a cam mounted on the shaft for rotation with the shaft, a plurality of fingers on the cam, a ratchet wheel mounted on the shaft for rotation with the shaft and having a plurality of teeth corresponding to the plurality of fingers on the cam, a pawl associated with the ratchet wheel for controlling the rotation of the shaft to an arc corresponding to that between two adjacent ratchet teeth, a second shaft, a contact arm carried by the second shaft and positioned to engage one of the fingers on the cam after each revolution to produce a rotation of the cam through an arc formed by adjacent fingers, a potentiometer having a movable arm mounted on the second shaft to provide infinitesimal variations of the potentiometer resistance, and means electrically connecting the potentiometer to the resistances to provide a continuously variable resistance value as the potentiometer arm is rotated.

3. Apparatus for providing a continuously variable resistance over a wide range of values, including, a potentiometer having a movable arm to provide an infinitesimal variation of the potentiometer resistance, a rotatable shaft carrying the movable arm, a contact arm on the shaft, a cam having a plurality of fingers positioned to provide an engagement with the contact arm upon each positioning of the contact arm corresponding to a maximum resistance of the potentiometer, a second rotatable shaft for carrying the cam, a ratchet wheel mounted on the second shaft and having a plurality of teeth corresponding to the number of fingers on the cam, a pawl for engaging the teeth of the ratchet wheel to limit the rotation of the ratchet wheel and the cam upon each engagement between the contact arm and the cam fingers, a switch having a plurality of contacts, a contact arm on the switch for providing an engagement with successive contacts on the switch upon the rotation of the second shaft, and a plurality of resistors forming a continuous circuit with the potentiometer, each resistor being connected between a pair of successive contacts on the switch and having a value less than the maximum effective value of the potentiometer.

JOHN ONIA.
GENRIK S. SIRVIS.

REFERENCES CITED

The following references are of record in the file of this patent:

UNITED STATES PATENTS

| Number | Name | Date |
| --- | --- | --- |
| 1,121,750 | Miller | Dec. 22, 1914 |
| 1,993,007 | Hunter | Mar. 5, 1935 |
| 2,537,671 | Jack et al. | Jan. 9, 1951 |